US009026902B2

(12) United States Patent
Carroll et al.

(10) Patent No.: US 9,026,902 B2
(45) Date of Patent: May 5, 2015

(54) HANDLING UNEXPECTED RESPONSES TO SCRIPT EXECUTING IN CLIENT-SIDE APPLICATION

(75) Inventors: Paul L. Carroll, Lakeway, TX (US); Sudhindra K. Rao, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 103 days.

(21) Appl. No.: 13/091,128

(22) Filed: Apr. 21, 2011

(65) Prior Publication Data
US 2012/0272131 A1 Oct. 25, 2012

(51) Int. Cl.
*G06F 17/00* (2006.01)
*G06F 17/30* (2006.01)
*G06F 21/33* (2013.01)

(52) U.S. Cl.
CPC .. *G06F 17/30899* (2013.01); *G06F 2221/2119* (2013.01); *G06F 21/33* (2013.01)

(58) Field of Classification Search
USPC ..................................... 715/234, 733; 726/6
See application file for complete search history.

(56) References Cited

U.S. PATENT DOCUMENTS

| | | | | |
|---|---|---|---|---|
| 5,903,901 | A * | 5/1999 | Kawakura et al. | 715/207 |
| 5,954,829 | A * | 9/1999 | McLain et al. | 714/712 |
| 6,427,233 | B1 * | 7/2002 | Lee et al. | 717/125 |
| 6,560,724 | B1 * | 5/2003 | Ganske | 714/43 |
| 6,771,746 | B2 * | 8/2004 | Shambaugh et al. | 379/88.13 |
| 6,952,723 | B1 * | 10/2005 | Laiho | 709/217 |
| 7,543,146 | B1 * | 6/2009 | Karandikar et al. | 713/175 |
| 8,190,708 | B1 * | 5/2012 | Short et al. | 709/219 |
| 8,332,654 | B2 | 12/2012 | Anbuselvan | |
| 2001/0047262 | A1 * | 11/2001 | Kurganov et al. | 704/270.1 |
| 2003/0065986 | A1 * | 4/2003 | Fraenkel et al. | 714/47 |
| 2003/0098887 | A1 * | 5/2003 | Li | 345/809 |
| 2003/0215066 | A1 * | 11/2003 | Shambaugh et al. | 379/88.13 |
| 2005/0166148 | A1 * | 7/2005 | Garding | 715/708 |
| 2005/0257098 | A1 * | 11/2005 | Andrews et al. | 714/43 |
| 2007/0083821 | A1 * | 4/2007 | Garbow et al. | 715/781 |
| 2007/0250563 | A1 * | 10/2007 | Lo | 709/203 |
| 2009/0172792 | A1 | 7/2009 | Backhouse | |
| 2010/0146291 | A1 | 6/2010 | Anbuselvan | |
| 2010/0146395 | A1 * | 6/2010 | Reyes et al. | 715/734 |
| 2010/0199188 | A1 * | 8/2010 | Abu-Hakima et al. | 715/733 |
| 2011/0035780 | A1 * | 2/2011 | Cedervall et al. | 725/110 |
| 2011/0154130 | A1 | 6/2011 | Helander et al. | |
| 2012/0072867 | A1 * | 3/2012 | Schlegel | 715/808 |
| 2012/0272133 | A1 | 10/2012 | Carroll et al. | |

OTHER PUBLICATIONS

IBM, "Concept for Leveraging Form-Based Authentication in a Web 2.0 Application Using Ajax". IP.com, IPCOM000180406D, Mar. 9, 2009. 3 pages.
Paul L. Carroll et al., U.S. Appl. No. 13/411,584, filed Mar. 4, 2012, Office Action, Mar. 12, 2014, 7 pages.

* cited by examiner

*Primary Examiner* — Stephen Hong
*Assistant Examiner* — Marshon Robinson
(74) *Attorney, Agent, or Firm* — Marcia L. Doubet

(57) ABSTRACT

Handling unexpected response messages at a client-side application such as a web browser, where those responses require the client-side application to issue an unexpected prompt and are triggered by request messages sent from script executing in the client-side application. A widget is dynamically constructed to provide the prompt to a user. Display and processing of the widgets and prompts is handled in a non-disruptive manner in an environment where a gateway function requesting the prompt may be interposed between a browser and a server in a network, and where the browser script may adhere to the Ajax methodology.

16 Claims, 8 Drawing Sheets

HANDLING UNEXPECTED RESPONSES TO SCRIPT EXECUTING IN CLIENT-SIDE APPLICATION

BACKGROUND

The present invention relates to computing systems, and deals more particularly with handling unexpected responses received in a client application such as a web browser, where the responses require the client-side application to issue an unexpected prompt and are triggered by requests from script executing in the client-side application.

In early scenarios involving web browsers and web servers, the content sent from the web server to the web browser comprised an entire web page. See FIG. 1, where components and flows of this approach are illustrated. As shown therein, a web browser 100 displays a web page (not shown in FIG. 1), and this web page sends 111 a request 110 for refreshed content. The request is received at a web application server 150, which processes 160 the request and sends 161 a revised web page back to the browser 100. Upon receiving the revised web page, the browser 100 refreshes the displayed page by loading 120 the response received from the server 150. While this approach was functional, it was determined to be undesirable when only a portion of the web page content was changed. As one problem with this existing approach, it was sometimes inconvenient or unpleasant for a user to view the frequent reloading (i.e., redisplaying) of the entire web page, because the reloading could cause what is referred to as a "screen flicker" phenomenon, where the page content appears to be flashing as it disappears for a moment and then reappears (i.e., due to the redisplay). As another problem, repeatedly sending the entire web page from the web server to the web browser often led to excessive bandwidth use for network transmissions.

BRIEF SUMMARY

The present invention is directed to handling unexpected content at a client-side application. In one aspect, this comprises: receiving, at a client-side application responsive to a request sent by the client-side application, a response message; and responsive to determining, at the client-side application, that the response message is not in an expected format (such as web page content in HyperText Markup Language format), creating a user input frame, inserting content from the response message into the user input frame, obtaining a user response from the user input frame, and returning the obtained user response to a sender of the response message. This aspect preferably further comprises dynamically modifying the response loaded in the user input frame to submit, to the sender of the response message, through an Ajax handler in the client application (such that a subsequent response will return to the Ajax handler in the client application).

Embodiments of these and other aspects of the present invention may be provided as methods, systems, and/or computer program products. It should be noted that the foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined by the appended claims, will become apparent in the non-limiting detailed description set forth below.

BRIEF DESCRIPTION OF THE SEVERAL VIEWS OF THE DRAWINGS

The present invention will be described with reference to the following drawings, in which like reference numbers denote the same element throughout.

DETAILED DESCRIPTION

Figure 1:
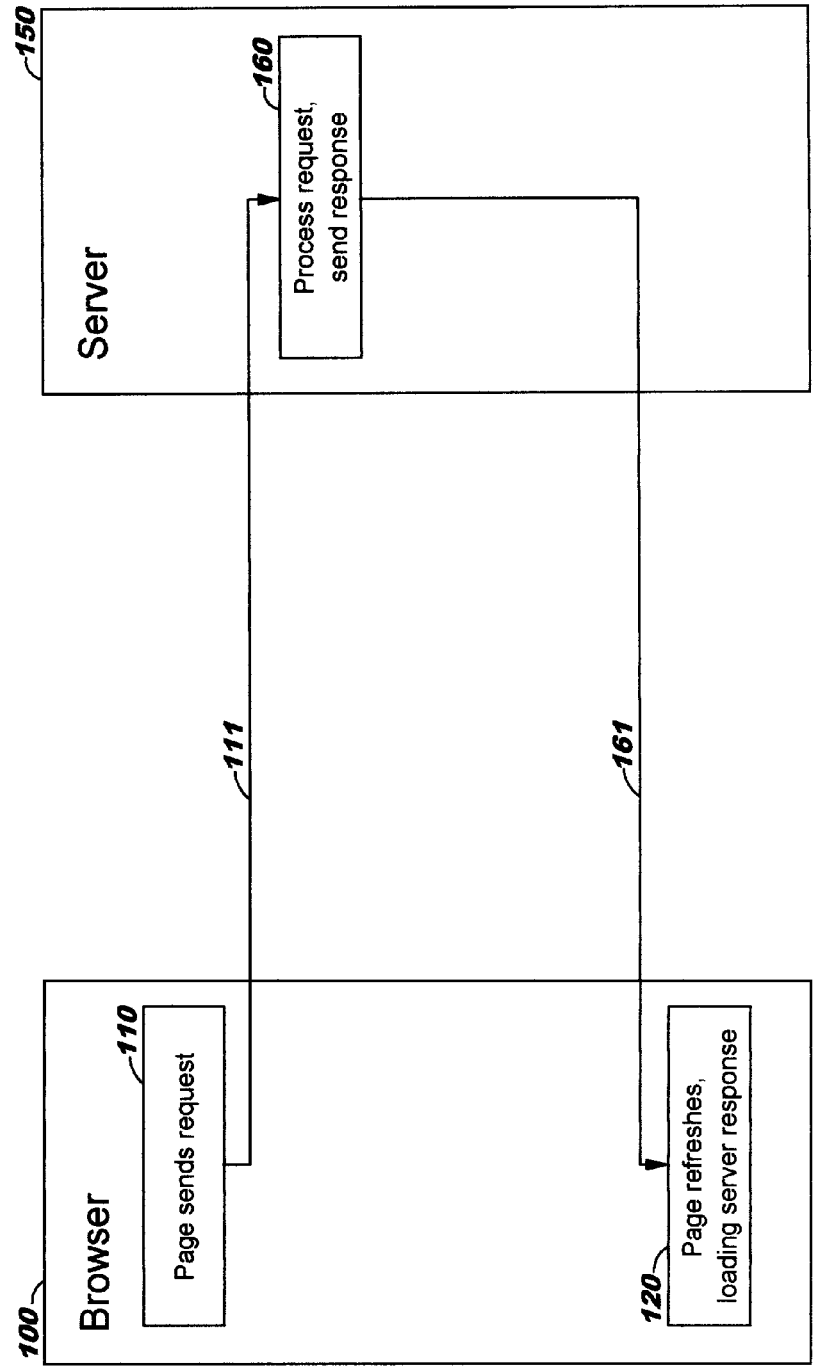
FIG. 1 illustrates components and flows of early scenarios involving web browsers and web servers, according to the prior art.

The present invention is directed to handling unexpected response messages at a client-side application such as a web browser, where those responses require the client-side application to issue an unexpected prompt and are triggered by request messages sent from script executing in the client-side application. Hereinafter, the client-side application is referred to as a browser, although this is by way of illustration and not of limitation. The browser script may be written using Asynchronous JavaScript and XML (although this is by way of illustration but not of limitation). Asynchronous JavaScript and XML is commonly referred to as "AJAX" or "Ajax", and generally connotes a set of methods that are usable for providing interactive web applications. (It should be noted that Ajax technology has evolved since its inception, and use of JavaScript and XML are no longer strictly required. Other scripting languages may be used instead of JavaScript, and notations other than XML may be used for data interchange, and such alternatives may be considered to be a form of Ajax technology.)

A server acting as a gateway may be deployed between a web browser and a web application server in a networking environment. The gateway may be used to protect access to particular resources or actions of the application server, and this protection may be based on resource name, request parameters, and/or other types of rules. When the gateway provides this type of access protection, a protected resource requested by the browser is not immediately returned to the browser. Instead, the gateway responds to the web browser request with a request for additional information. For example, if the application server stores e-mail messages, the gateway may be responsible for obtaining an e-mail user's address and password before allowing the browser application to access the e-mail messages stored on the application server, and the gateway may therefore respond to the web browser request by sending the browser a gateway-initiated request to prompt the user for the user's address and password. As another example, the web application server might host a contest application, where the contest is only open to users who are at least a certain age. In this scenario, the gateway may respond to a browser request to access the contest by sending the browser a gateway-initiated request to prompt the user to provide his or her birth date. In yet another example, the gateway may be configured to monitor outbound requests from a home network, and to solicit parental approval prior to passing selected requests on to the Internet (using rules that are not necessarily specific to a particular web application). In a still further example, the gateway might determine that payment is required before a particular web page can be displayed, and may then require payment information from the user before allowing a connection request to be transmitted to the particular web page. These examples are illustrative but not limiting of the types of additional information which may be requested. It may also happen that the gateway is configured to respond to a browser request with a gateway-initiated request for a user confirmation of some type—such as requesting the user to press a graphical "OK" button to confirm that he or she wishes to proceed—rather than specifically requesting additional information from the user. Thus, references herein to obtaining additional information from the user and to obtaining confirmation from the user are intended to be different forms of the same client-side prompting scenario. It should also be noted that the requests which are intercepted by the gateway do not need to be known in advance to the client application, and the timing of such intercepted requests also does not need to be known in advance.

Figure 2:
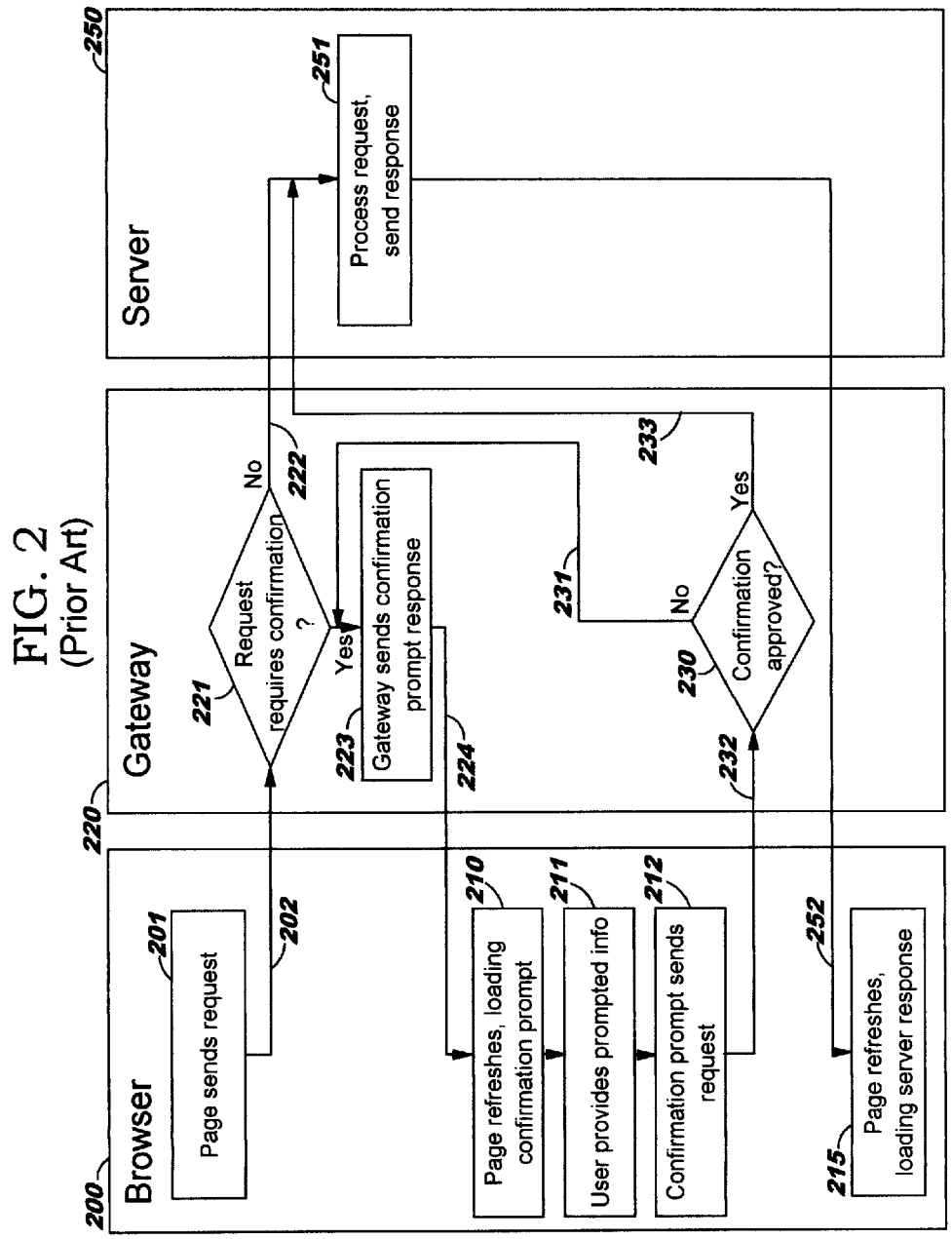
FIG. 2 illustrates component and flows of a scenario where a gateway protects access to resources of a web application server, according to the prior art.

FIG. 2 illustrates component and flows of the above-described scenario where a gateway 220 is placed between browser 200 and web application server 250. Similar to FIG. 1, web browser 200 is again displaying a web page, and this web page sends a request 201 for refreshed content. In FIG. 2, the request 201 is sent 202 to the gateway 220. Upon receiving the request at the gateway 220, the gateway checks 221 to see if this request 201 requires some type of user confirmation. (Hereinafter, discussions of checking to see if the browser's request requires confirmation should be interpreted as checking instead, or in addition, to see if the browser request is for a protected resource.) Typically, gateway 220 stores a list or other structure, identifying the resources of application server 250 that require confirmation (or alternatively, identifying requests for which the gateway will provide access protection). Accordingly, the test at Block 221 typically comprises checking the incoming request 201 against the stored list or other structure.

When gateway 220 determines that the request 201 does not require confirmation (i.e., the test at Block 221 has a negative result), the request is forwarded 222 from gateway 220 to the web application server 250, which processes 251 the request and sends 252 a revised web page back to the browser 200 in a similar manner to the processing illustrated in FIG. 1, after which the browser 200 refreshes the displayed page by loading 215 the response received from the server 250.

On the other hand, when gateway 220 determines that the request 201 does require confirmation (i.e., the test at Block 221 has a positive result), this indicates that the gateway needs to intercept the request and obtain additional information from the browser before the gateway will forward the request to the web application server 250. Accordingly, the gateway creates a response message 223 that contains a request for the confirmation (or alternatively, a request for additional information), and sends 224 this response message to the browser 200. The gateway-initiated request is referred to in FIG. 2 as a "confirmation prompt" for ease of reference, and this term is used herein to refer to a prompt which is displayed by the browser to enable a user to provide a confirmation or to provide some type of additional information. Providing a confirmation may comprise, for example, pressing an "OK" graphical button responsive to reading and accepting a message that is provided in the confirmation prompt, wherein this graphical button is also rendered in the confirmation prompt.

Upon receiving the response message 223 at browser 200, the browser refreshes the currently-displayed page by loading 210 the confirmation prompt received from gateway 220. User input 211 is then received, responsive to the display of the confirmation prompt. A new request message 212 is created from the user's response, and this message is then sent 232 from the browser 200 back to gateway 220. Gateway 220 determines that this incoming message 212 provides the confirmation (or additional information, alternatively) that was requested by message 223. A verification process 230 is typically performed, whereby the gateway determines whether the information in the user's response is approved. If it is not approved (i.e., the test in Block 230 has a negative result), then processing returns to Block 223 to send another message to the browser, as shown by reference number 231. On the other hand, if the information in the user's response is approved (i.e., the test in Block 230 has a positive result), then gateway 220 preferably forwards 233 the original request for a protected resource to the web application server 250. Web application server 250 processes 251 the request and sends 252 a revised web page back to the browser 200 in a similar manner to the processing illustrated in FIG. 1, after which the browser 200 refreshes the displayed page by loading 215 the response received from the server 250.

The approach illustrated in FIG. 2 is functionally sufficient for scenarios where the browser 200 is requesting an entire web page from the application server 250, because the gateway's requested confirmation prompt 223 can also be presented 210 in browser 200 as a web page. However, as discussed earlier, transmitting entire web pages and reloading entire web pages has drawbacks in some scenarios. More modern approaches to refreshing web page content therefore allow for reloading a selected portion (or portions, equivalently) of a currently-displayed web page while remaining portions are not reloaded. This reduces the screen flicker phenomenon and also reduces network bandwidth usage.

Use of browser script within web pages is one technique for reloading a selected portion of a web page, allowing a browser to support an interactive web application that sends requests for updated content portions to a web application server and then reloads the portion of the web page with the updated content received from the server. The above-discussed Ajax technology is often used in today's web applications, and subsequent discussions herein refer to browser script that retrieves data using Ajax technology. An Ajax request from a client-side application might be formatted, for example, using syntax such as 'http://server/servletAction?queryTerm="someValue"', and a response to this query may comprise a markup language document or a string that the client application is adapted for processing. Alternative implementations that use technology other than Ajax to achieve the functionality described herein are considered to fall within the scope of the present invention, however.

Figure 3:
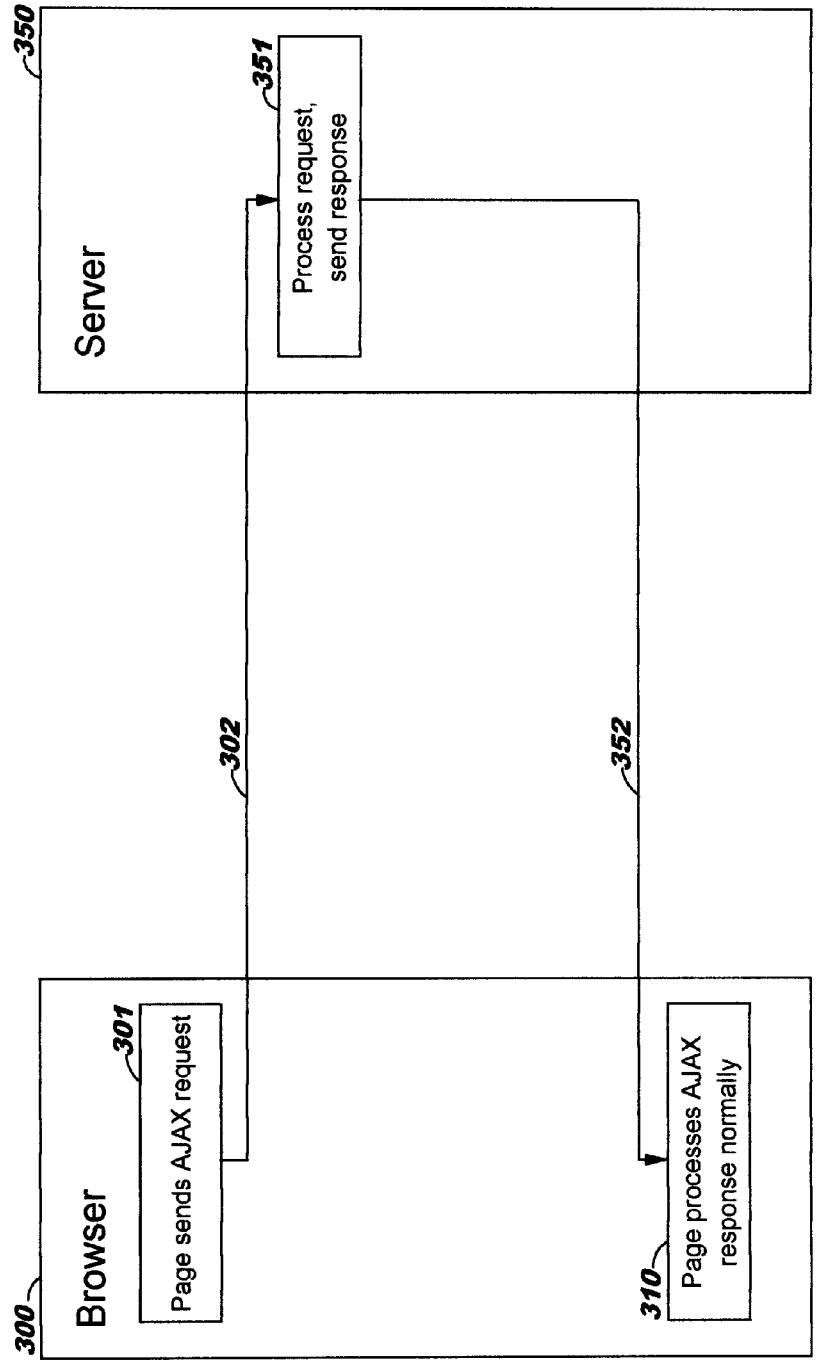
FIG. 3 illustrates components and flows involving web browsers and web servers exchanging messages triggered by browser script, according to the prior art.

FIG. 3 illustrates components and flows of an interactive web application that uses Ajax for browser script support. As shown therein, a web browser 300 displays a web page (not shown in FIG. 3) that uses Ajax, and this web page sends 302 a request 301 for refreshed content for a selected portion of the currently-displayed web page. The request is received at a web application server 350, which processes 351 the request and sends 352 revised web page content back to the browser 300. Upon receiving the revised web page content, the browser 300 uses Ajax support to process 310 the response (which may comprise refreshing a selected portion of the displayed page by loading the response received from the server 350 into that portion of the web page).

The approach shown in FIG. 3 is functional and suitable in many cases. However, when resources at the web application server 350 need to be access protected through a gateway, several problems may arise, as will now be described with reference to the components and flows illustrated in FIG. 4.

Figure 4:
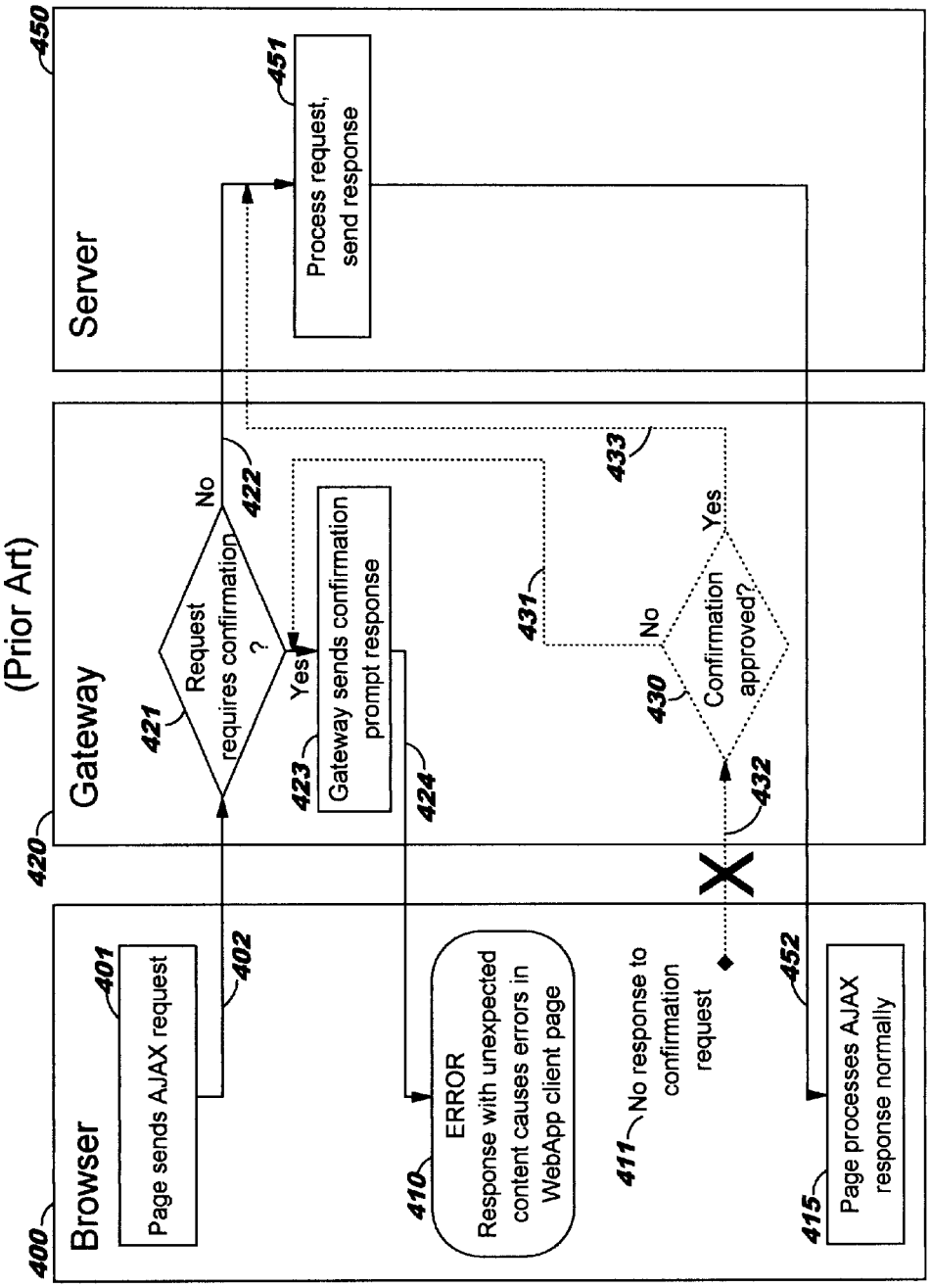
FIG. 4 illustrates component and flows of a scenario where a gateway protects access to resources of a web application server communicating with a web browser that sends messages triggered by browser script, according to the prior art.

Referring now to FIG. 4, web browser 400 is again displaying a web page that uses Ajax, and browser script executing in this web page sends a request 401 for refreshed content for a selected portion of the currently-displayed web page. In contrast to FIG. 3, the request 401 of FIG. 4 is sent 402 to gateway 420. Upon receiving the request at the gateway 420, the gateway checks 421 to see if this request 401 requires confirmation. Typically, the test at Block 421 comprises gateway 420 checking the incoming request 401 against a stored list or other structure.

When gateway 420 determines that the request 401 does not require confirmation (i.e., the test at Block 421 has a negative result), the request is forwarded 422 from gateway 420 to the web application server 450, which processes 451 the request and sends 452 revised web page content back to the browser 400 in a similar manner to the processing illustrated in FIG. 3, after which the browser 400 processes 415 the response using Ajax (which may comprise refreshing a selected portion of the displayed page by loading the response received from the server 450 into that portion of the web page).

On the other hand, when gateway 420 determines that the request 401 does require confirmation (i.e., the test at Block 421 has a positive result), this indicates that the gateway needs to intercept the request and obtain additional information from the browser before the gateway will forward the request to the web application server 450. Accordingly, the gateway creates a response message 423 that contains a request for the additional information, and sends 424 this response message to the browser 400.

A first problem arises, however, because of the need to present the gateway-requested confirmation prompt in a non-disruptive way, using the original format of the confirmation request. If the gateway requests a month, date, and year of the user's birth, for example, then the confirmation prompt should be formatted to obtain each of these pieces of information. It is impractical to code the browser application with a static set of predetermined, prebuilt graphical user interface prompt widgets on the expectation that the gateway-initiated requests will only ask for information that can be obtained using this set of prompt widgets. As one illustration of problems inherent in using prebuilt prompt widgets that support a static set of predetermined requests, the browser script might be coded to respond to a gateway request for a password by displaying a password prompt widget that accepts the user's input. However, if the gateway was subsequently changed to ask for a CAPTCHA confirmation (i.e., a confirmation that uses an image which can be interpreted by a human but is difficult for a machine to interpret, thereby preventing automated security attacks) instead of or in addition to a password, the browser script would be unable to handle this new confirmation request without rewriting at least some portion of the script. The browser may therefore be unable to translate the CAPTCHA confirmation request into anything that can be prompted through the user interface. This problem is illustrated at reference number 410 in FIG. 4, which notes that unexpected content in the gateway request 423 may cause errors at the browser.

More generally, providing a static set of prebuilt prompt widgets presumes an application-specific link between a browser script and a gateway. A more generic, application-independent gateway model is preferred, whereby a gateway may be used with different web applications and therefore dynamically determines the needed content for confirmation prompts. Embodiments of the present invention therefore do not assume that the gateway is specifically configured for access protection of any particular web application.

An embodiment of the present invention also provides flexibility in how the gateway determines whether a confirmation prompt is needed. For example, in addition to or instead of checking the browser-initiated request against a list of protected resources, the gateway might be configured to scan incoming browser requests for some combination or pattern of parameter values and to issue a confirmation request in response to detection thereof. When using parameter values as a criteria for requesting a confirmation prompt, the number of parameters and/or the value of parameters checked by the gateway may change relatively frequently, and a statically-defined set of prompt widgets is therefore not suitable.

Note also that there may be instances where a list of the resources protected by a gateway is not readily available to web application developers, thus preventing the developers from creating a set of prompt widgets specifically directed to supporting expected confirmation prompt requests from the gateway. The list of protected resources may also not be readily available to script developers, thus preventing them from writing script that handles protected resources differently from other resources. Accordingly, a preferred embodiment of the present invention handles confirmation prompt requests from a gateway without prior knowledge of the content and/or format of such prompt requests.

Referring again to the scenario illustrated in FIG. 4, a second problem arises relative to receipt of the protected resource originally requested by the browser script. Assuming that a suitable prompt widget is used to prompt the user, and that the additional information provided by the user is successfully verified by the browser, then the originally-requested resource will be returned to the browser from the web application server. However, when using existing techniques, displaying the prompt widget may have changed the focus of the user interface, and it is undesirable for the returned resource to be displayed wherever the focus now happens to be. Or, the resource might not be intended for display, but rather for interpretation by the browser script. Accordingly, the returned resource should be processed by a browser script function that is written for that purpose and which is expecting to received the returned resource in response to the browser script's original request (i.e., the request that caused the gateway to send the confirmation prompt message). Accordingly, a preferred embodiment of the present invention returns the requested resource to the normal Ajax flow when the configuration prompt is successful.

A third problem arises in the scenario depicted in FIG. 4 when the original flow of the browser script is disrupted. That is, when the user provides input responsive to a prompt widget, the user may press an "Enter" graphical button or similar graphical control to signify that entry of the requested additional information is finished. When using existing techniques, this signal will typically only apply to the prompt widget, however, which leaves the underlying browser script without a signal that it is time to transmit the obtained additional information to the gateway. The obtained additional information is therefore not sent to the gateway, as indicated at reference numbers 411, 432 of FIG. 4. In turn, gateway 420 has nothing to verify or approve at Block 430, and will therefore not exercise paths 431, 433. Requiring the user to perform some additional action, such as explicitly requesting a retry or pressing another "Enter" graphical button, to trigger the sending of the obtained additional information to the gateway is undesirable. Accordingly, a preferred embodiment of the present invention ensures that the obtained additional information is forwarded to the gateway in a manner that is transparent to the user, and that is also transparent to the flow of the browser script, such that processing within the browser script resumes where it left off following the request for the protected resource.

A fourth problem may arise in the scenario of FIG. 4 when portions of the currently-displayed web page are asynchronously refreshed. If the confirmation prompt widget is displayed in an area of the graphical user interface which is then asynchronously refreshed, the prompt widget may be overlaid when using existing techniques. Accordingly, a preferred embodiment of the present invention isolates the request for additional information from other content in the browser.

Figure 5:
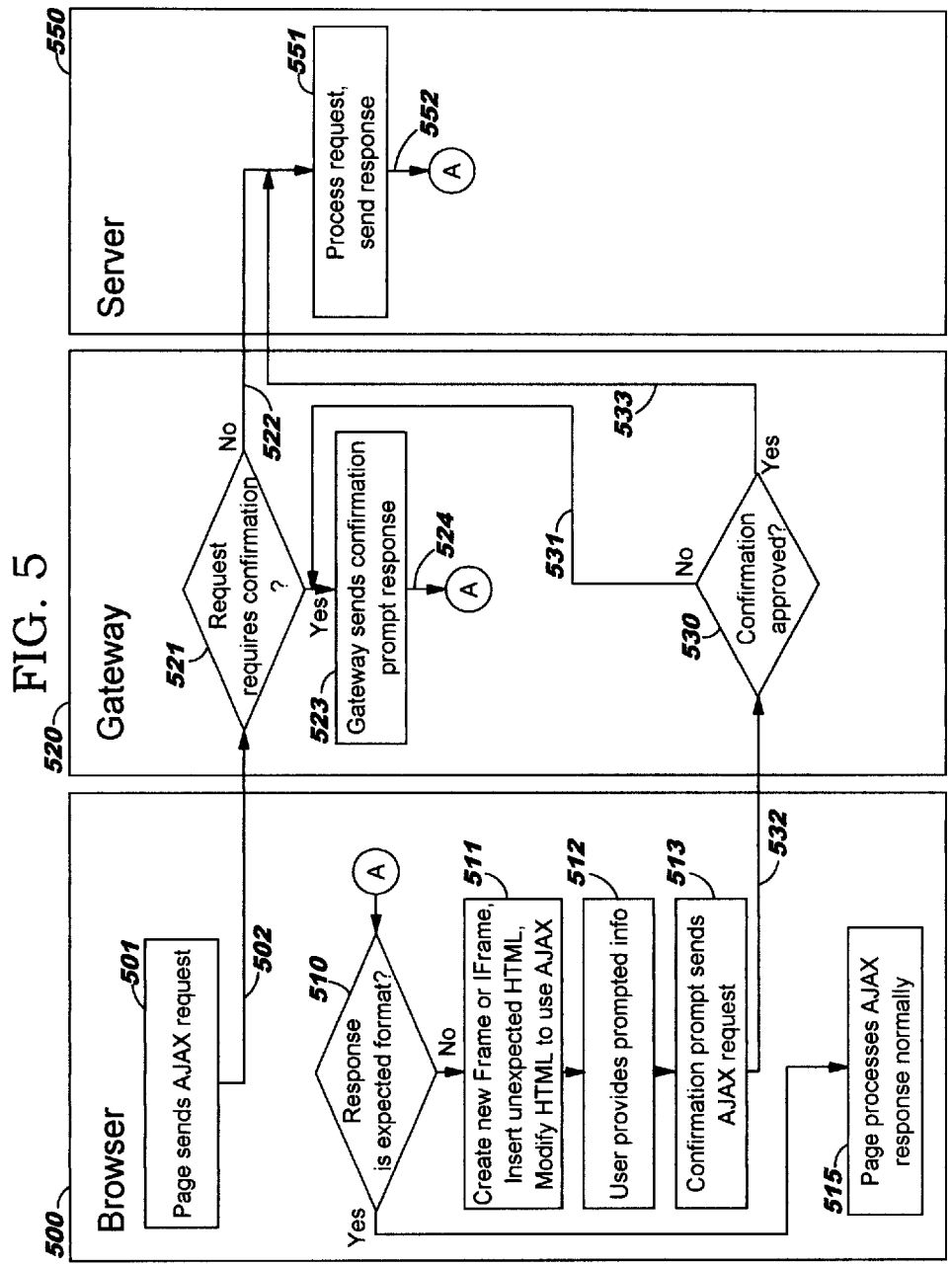
FIG. 5 illustrates component and flows of a scenario where a gateway protects access to resources of a web application server communicating with a web browser that sends messages triggered by browser script, according to a preferred embodiment of the present invention.

Referring now to FIG. 5, components and flows are illustrated for an embodiment of the present invention. A gateway 520 is placed between a web application server 550 and a web browser 500 which sends messages triggered by browser script. Web browser 500 is displaying a web page that uses Ajax, and browser script executing in this web page sends a request 501 for refreshed content. In FIG. 5, the request 501 is sent 502 to the gateway 520. Upon receiving the request at the gateway 520, the gateway checks 521 to see if this request 501 requires confirmation (or otherwise requires additional information). This preferably comprises gateway 520 checking the request 501 against a list or other structure in which criteria for requiring a confirmation prompt are stored, as discussed earlier.

When gateway 520 determines that the request 501 does not require confirmation (i.e., the test at Block 521 has a negative result), the request is forwarded 522 from gateway 520 to the web application server 550, which processes 551 the request and sends 552 the requested content back to the browser 500 for processing by an Ajax handler at 510.

On the other hand, when gateway 520 determines that the request 501 does require confirmation (i.e., the test at Block 521 has a positive result), this indicates that the gateway needs to intercept the request and obtain additional information from the browser before the gateway will forward the request to the web application server 550. Accordingly, the gateway creates a response message 523 that contains a request for the confirmation (or alternatively, a request for additional information), and sends 524 this response message to the browser 500 for processing by the Ajax handler at 510. The confirmation prompt response 523 preferably comprises web page content encoded in the HyperText Markup Language ("HTML") notation. The HTML content of the confirmation prompt response 523 may be dynamically constructed, and may be detected at Block 510 by presence of a string "HTTP" or other web page structure elements in the confirmation prompt response. The particular structure of confirmation prompt response 523 is not material to the scope of the present invention, and contents provided therein as a web page may be any valid HTML full page which can be distinguished, at Block 510, from the explicitly-expected response from the web application server.

The processing by the Ajax handler at Block 510 of FIG. 5 checks to see if a received response is in an expected format. This test has a positive result when the received response comprises the originally-requested resource (which may comprise updated web page content) sent from web server 550 as shown by reference number 552. (Typically, the response to the originally-requested resource comprises a data string, which may be encoded in XML or another data interchange notation.) Processing then continues at Block 515, where browser 500 processes the Ajax response (which may comprise refreshing the displayed page by loading the response received from the server 550).

On the other hand, when the test at Block 510 has a negative result, then the response is an unexpected response. As noted earlier, according to preferred embodiments, this unexpected input is preferably detected by determining that the inbound message is not the text string or structured data which was expected as an Ajax response for parsing by the browser script; instead, the inbound message comprises the HTML page content sent to browser 500 as the confirmation prompt 523 from gateway 520, as shown by reference number 524. Processing therefore continues at Block 511, which creates a new frame (or equivalently, a new iFrame) for a confirmation prompt widget, populates that new frame with the unexpected HTML content extracted from the confirmation prompt response 523, and modifies the HTML to use Ajax. This modifying preferably comprises searching through the document object model ("DOM") that corresponds to the HTML page 523 to locate any forms or anchors encoded therein that could submit a request to the server. The HTML code corresponding to any such located forms or anchors is programmatically modified to submit through Ajax instead, thereby causing responses to any requests sent by these forms or anchors to target (i.e., to return to) the Ajax handler in the browser. This preferably comprises modifying any <onClick> syntax to submit the address therein through Ajax—and accordingly, the user's response to the confirmation prompt at Block 513 will be transmitted immediately, without requiring an additional user click.

The dynamically-constructed confirmation prompt widget from Block 511 is rendered, and user input is received (Block 512). The prompt widget creates a new Ajax request message from the user's response (Block 513), and this message is then sent 532 from the browser 500 back to gateway 520 using Ajax. Gateway 520 determines that this incoming message provides the additional information (or confirmation, alternatively) that was requested by message 523. A verification process 530 is preferably performed, whereby the gateway determines whether the information in the user's response is approved. If it is not approved (i.e., the test in Block 530 has a negative result), then processing returns to Block 523 to send 524 another message to the browser to again request the confirmation prompt. On the other hand, if the information in the user's response is approved (i.e., the test in Block 530 has a positive result), then gateway 520 forwards 533 the user's request for a protected resource to the web application server 550. Web application server 550 processes 551 the request and sends 552 the requested content back to the browser 500 for processing by the Ajax handler at 510. Notably, because this response is in the expected format, rather than a confirmation prompt request, the test at Block 510 will pass the response—including the requested content contained therein—to Block 515, where the browser 500 uses Ajax support to process the response (which may comprise refreshing a selected portion of the displayed page by loading requested content into that portion of the web page).

It should be noted that while FIG. 5 illustrates the revised web page content being sent at 552 from the server 550 to the Ajax handler at 510, web server 550 may alternatively send this content to the gateway 520 for forwarding to the Ajax handler 510.

Figure 6:
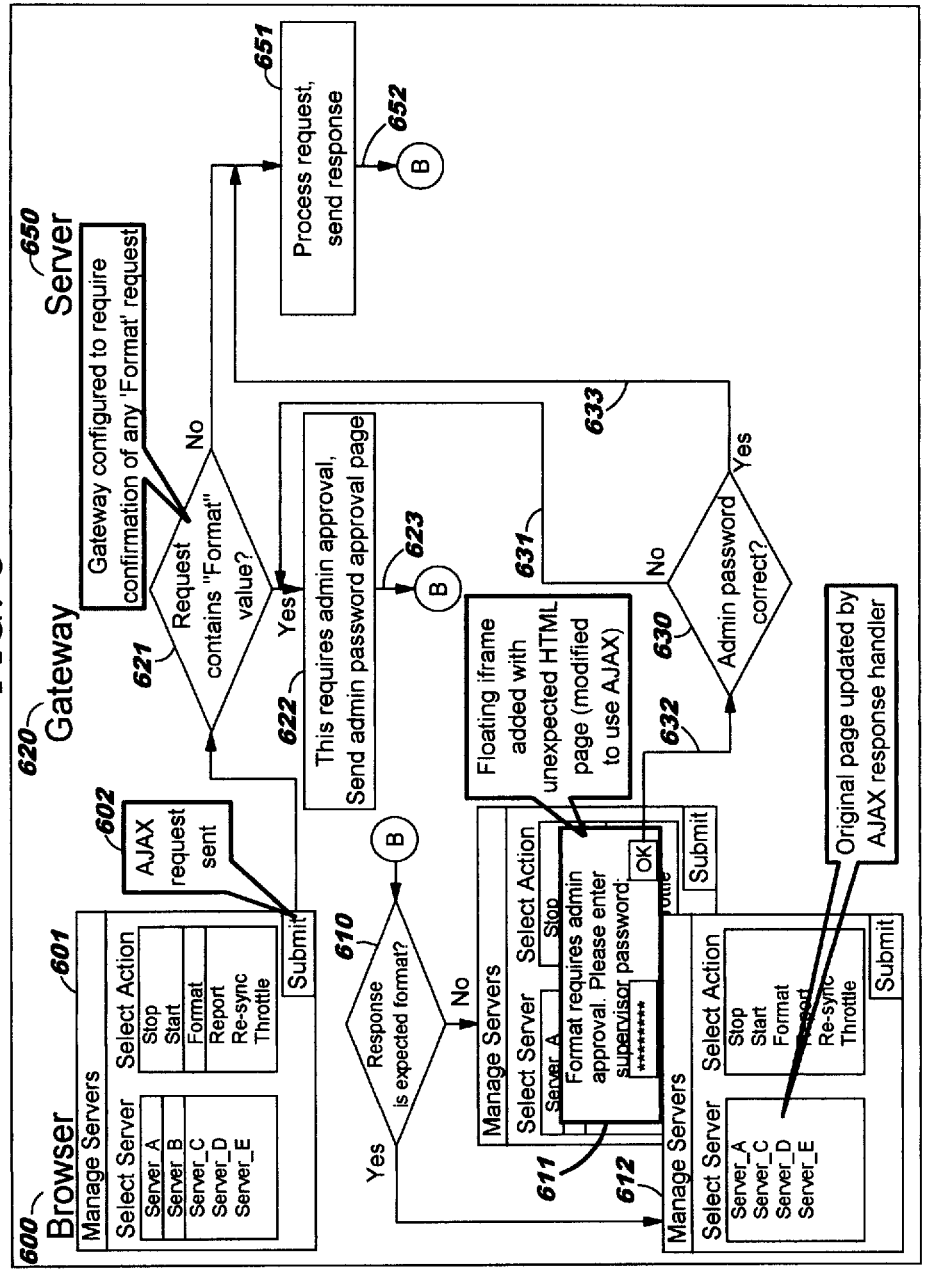
FIG. 6 illustrates an example scenario where the gateway of FIG. 5 detects that the browser script has requested a protected resource, and therefore intervenes to prompt the user for additional information before allowing the request to be forwarded to the web application server, according to a preferred embodiment of the present invention.

FIG. 6 illustrates an example scenario where the gateway 620 detects that the browser script has requested a protected resource, and therefore intervenes to prompt the user for additional information before allowing the request to be forwarded to the web application server. In this example, browser 600 is displaying a "Manage Servers" web page 601, and the user has selected the "Server_B" entry from the "Select Server" column and has selected "Format" from the "Select Action" column. (Horizontal bars are used, for drafting convenience, to signify selection of the Server_B and Format entries within web page 601.) The user then presses the "Submit" graphical button, which causes an Ajax request to be sent 602 to the gateway 620.

In this example scenario, gateway 620 is configured to require confirmation of any request that contains the action "Format". Accordingly, Block 621 tests whether the request contains this value (e.g., in a parameter name, parameter value pair, where the parameter name is "Action" or the like and the value is "Format"). Because the test in Block 621 has a positive result, in this example, the gateway determines that the requested action requires administrator approval. The gateway therefore creates (Block 622) an HTML page containing content for obtaining an administrator's password, and sends 623 this HTML page to the browser, in a response message, for processing by the Ajax handler (which was discussed with reference to 510 in FIG. 5).

Upon receiving the confirmation prompt request at the Ajax handler of browser 600, the test at Block 610 finds that this received response is not in the expected format—that is, it is an HTML page and not a data string that was expected for use in the browser script. Accordingly, the processing of Block 511 of FIG. 5 creates a new iFrame for a confirmation prompt widget, populates that new frame with content extracted from the HTML page created at Block 622, and modifies the HTML to use Ajax (as discussed above with reference to FIG. 5). This dynamically-constructed confirmation prompt widget is illustrated at 611, where it is shown as a floating iFrame that is rendered over the original web page 601. After the user provides a password in this prompt widget 601 and presses the "OK" graphical button (corresponding to Block 512 of FIG. 5), the prompt widget creates a new Ajax request message from the user's response (as discussed with reference to Block 513 of FIG. 5), and this message is then sent 632 from the browser 600 back to gateway 620 using Ajax.

Gateway 620 then verifies (Block 630) whether the administrator's password, as represented by the message sent at 632, is correct. If not (i.e., the test in Block 630 has a negative result), then processing returns 631 to Block 622 to send 623 another message to the browser to again request the administrator's password. On the other hand, if the administrator's password is correct (i.e., the test in Block 630 has a positive result), then gateway 620 forwards 633 the user's request for a protected resource—in this case, the request to format a selected server—to the web application server 650. Web application server 650 processes 651 the request and sends 652 the requested content back to the browser 600 for processing by the Ajax handler. Notably, because this response is in the expected format—that is, it is a data string, which may comprise a status code or other content pertaining to the formatting of the selected server—the test at Block 610 will pass the response to the logic in the browser script that expects this response (which may comprise updating a selected portion of the displayed web page 601 by loading the updated content) as discussed above. A resulting updated web page, for this example, is shown at 612, where it can be seen that the entry "Server_B" is no longer presented in the "Select Server" column.

The processing which has been described above allows a gateway to request confirmation prompts for selected data, where widgets for the confirmation prompts are dynamically constructed, and handles the display and processing of those confirmation prompts in a non-disruptive way in an Ajax environment. This is in contrast to existing approaches, which must either request an entire replacement web page, avoid the use of Ajax, and/or limit confirmation prompts to a predetermined set of prebuilt confirmation widgets which the browser script is coded to expect.

While preferred embodiments have been discussed above with reference to a gateway that is separate from the web application server and web browser, the gateway functionality may alternatively be incorporated within either the web application server or the web browser without departing from the scope of the present invention.

Figure 7:
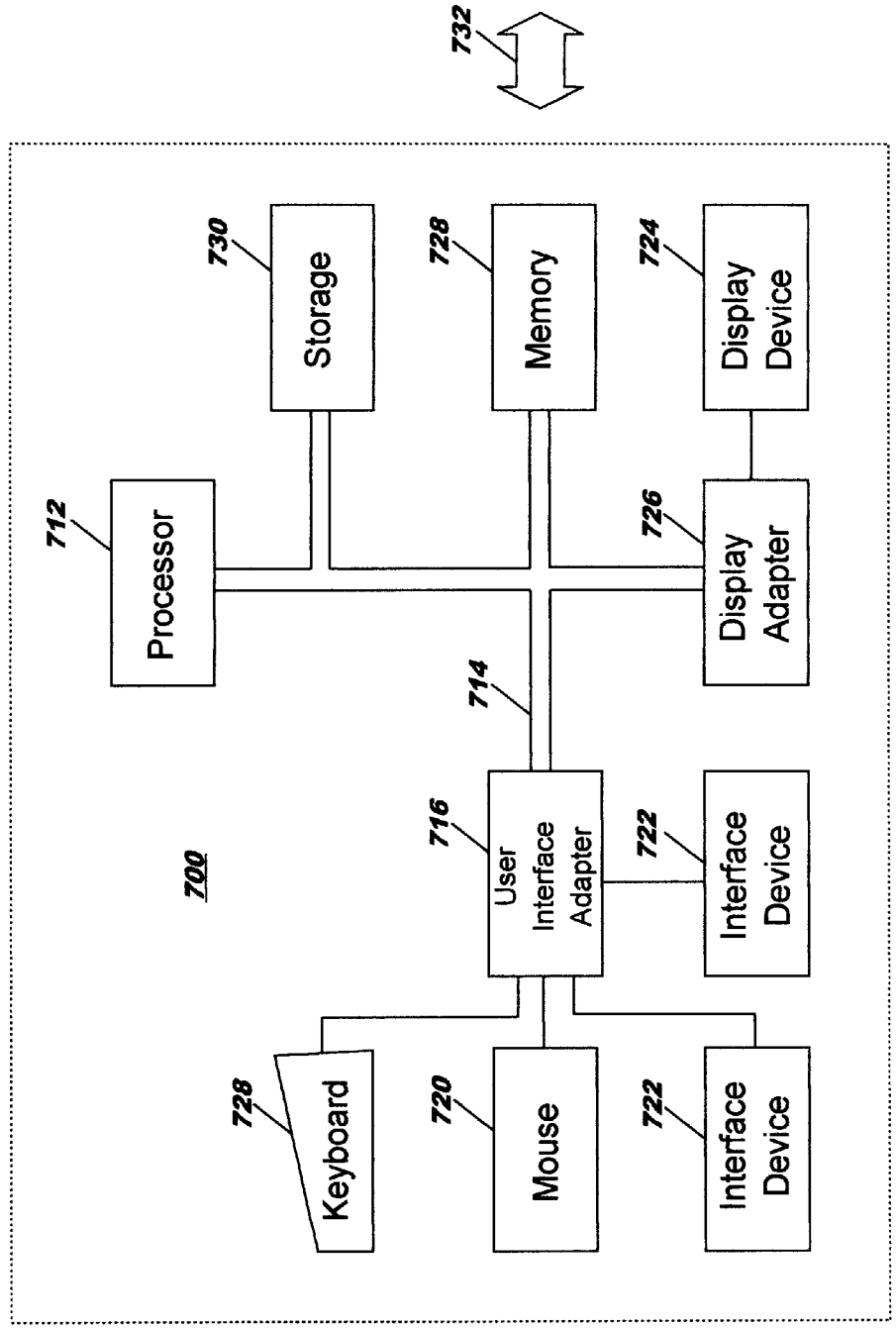
FIG. 7 depicts a data processing system suitable for storing and/or executing program code.

Referring now to FIG. 7, a data processing system 700 suitable for storing and/or executing program code includes at least one processor 712 coupled directly or indirectly to memory elements through a system bus 714. The memory elements can include local memory 728 employed during actual execution of the program code, bulk storage 730, and cache memories (not shown) which provide temporary storage of at least some program code in order to reduce the number of times code must be retrieved from bulk storage during execution.

Input/output ("I/O") devices (including but not limited to keyboards 718, displays 724, pointing devices 720, other interface devices 722, etc.) can be coupled to the system either directly or through intervening I/O controllers or adapters (716, 726).

Network adapters may also be coupled to the system to enable the data processing system to become coupled to other data processing systems or remote printers or storage devices through intervening private or public networks (as shown generally at 732). Modems, cable modem attachments, wireless adapters, and Ethernet cards are just a few of the currently-available types of network adapters.

Figure 8:
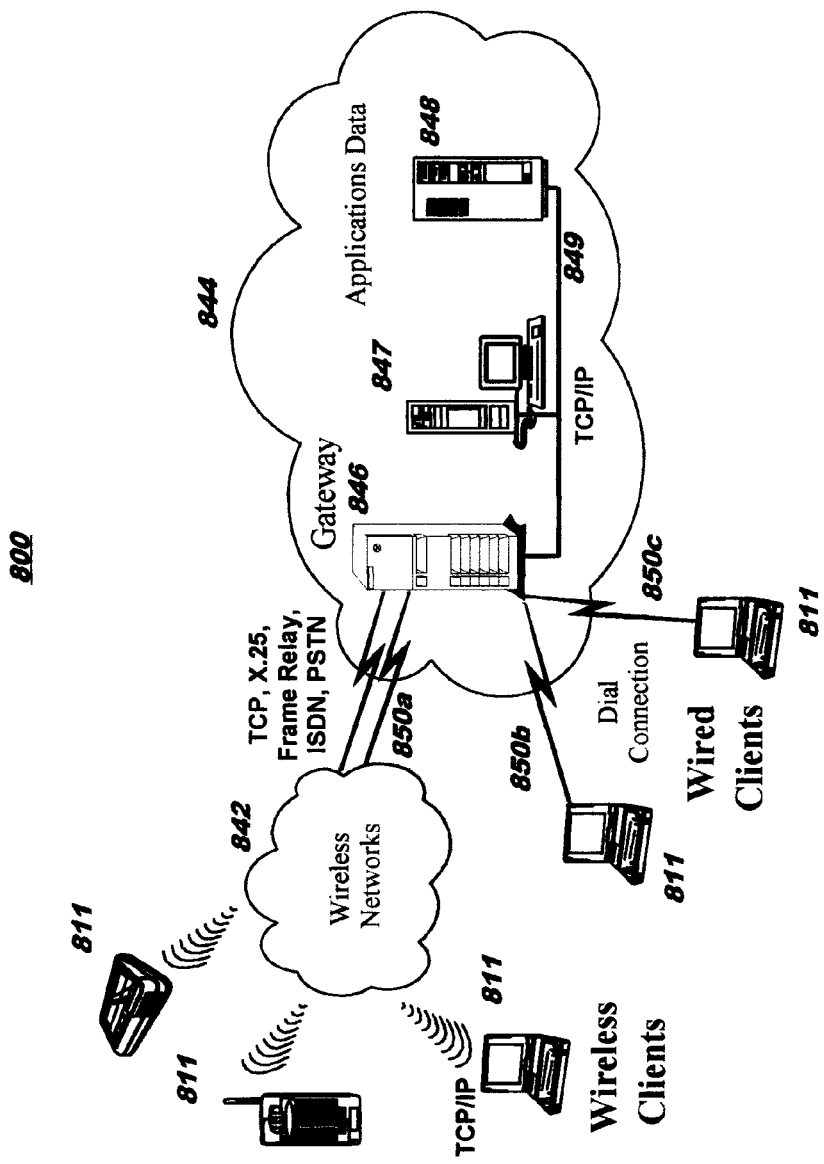
FIG. 8 depicts a representative networking environment in which one or more embodiments of the present invention may be used.

FIG. 8 illustrates a data processing network environment 800 in which the present invention may be practiced. The data processing network 800 may include a plurality of individual networks, such as wireless network 842 and wired network 844. A plurality of wireless devices 810 may communicate over wireless network 842, and a plurality of wired devices, shown in the figure (by way of illustration) as workstations 811, may communicate over network 844. Additionally, as those skilled in the art will appreciate, one or more local area networks ("LANs") may be included (not shown), where a LAN may comprise a plurality of devices coupled to a host processor.

Still referring to FIG. 8, the networks 842 and 844 may also include mainframe computers or servers, such as a gateway computer 846 or application server 847 (which may access a data repository 848). A gateway computer 846 serves as a point of entry into each network, such as network 844. The gateway 846 may be preferably coupled to another network 842 by means of a communications link 850*a*. The gateway 846 may also be directly coupled to one or more workstations 811 using a communications link 850*b*, 850*c*, and/or may be indirectly coupled to such devices. The gateway computer 846 may be implemented utilizing an Enterprise Systems Architecture/390® computer available from IBM. Depending on the application, a midrange computer, such as an iSeries®, System i™, and so forth may be employed. ("Enterprise Systems Architecture/390" and "iSeries" are registered trademarks, and "System i" is a trademark, of IBM in the United States, other countries, or both.)

The gateway computer 846 may also be coupled 849 to a storage device (such as data repository 848).

Those skilled in the art will appreciate that the gateway computer 846 may be located a great geographic distance from the network 842, and similarly, the workstations 811 may be located some distance from the networks 842 and 844, respectively. For example, the network 842 may be located in California, while the gateway 846 may be located in Texas, and one or more of the workstations 811 may be located in Florida. The workstations 811 may connect to the wireless network 842 using a networking protocol such as the Transmission Control Protocol/Internet Protocol ("TCP/IP") over a number of alternative connection media, such as cellular phone, radio frequency networks, satellite networks, etc. The wireless network 842 preferably connects to the gateway 846 using a network connection 850*a* such as TCP or User Datagram Protocol ("UDP") over IP, X.25, Frame Relay, Integrated Services Digital Network ("ISDN"), Public Switched Telephone Network ("PSTN"), etc. The workstations 811 may connect directly to the gateway 846 using dial connections 850*b* or 850*c*. Further, the wireless network 842 and network 844 may connect to one or more other networks (not shown), in an analogous manner to that depicted in FIG. 8.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit", "module", or "system". Furthermore, aspects of the present invention may take the form of a computer program product embodied in one or more computer readable media having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory ("RAM"), a read-only memory ("ROM"), an erasable programmable read-only memory ("EPROM" or flash memory), a portable compact disc read-only memory ("CD-ROM"), DVD, an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency, etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages such as the "C" programming language or similar programming languages. The program code may execute as a stand-alone software package, and may execute partly on a user's computing device and partly on a remote computer. The remote computer may be connected to the user's computing device through any type of network, including a local area network ("LAN"), a wide area network ("WAN"), or through the Internet using an Internet Service Provider.

Aspects of the present invention are described above with reference to flow diagrams and/or block diagrams of methods, apparatus (systems), and computer program products according to embodiments of the invention. It will be understood that each flow or block of the flow diagrams and/or block diagrams, and combinations of flows or blocks in the flow diagrams and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram flow or flows and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram flow or flows and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flow diagram flow or flows and/or block diagram block or blocks.

Flow diagrams and/or block diagrams presented in the figures herein illustrate the architecture, functionality, and operation of possible implementations of systems, methods, and computer program products according to various embodiments of the present invention. In this regard, each flow or block in the flow diagrams or block diagrams may represent a module, segment, or portion of code, which comprises one or more executable instructions for implementing the specified logical function(s). It should also be noted that, in some alternative implementations, the functions noted in the flows and/or blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or each flow of the flow diagrams, and combinations of blocks in the block diagrams and/or flows in the flow diagrams, may be implemented by special purpose hardware-based systems that perform the specified functions or acts, or combinations of special purpose hardware and computer instructions.

While embodiments of the present invention have been described, additional variations and modifications in those embodiments may occur to those skilled in the art once they learn of the basic inventive concepts. Therefore, it is intended that the appended claims shall be construed to include the described embodiments and all such variations and modifications as fall within the spirit and scope of the invention.

The invention claimed is:

1. A system for handling unexpected content at a client-side application, comprising:
   a computer comprising a processor; and
   instructions which are executable, using the processor, to implement functions comprising:
      sending, from a client-side application, a content request to a server for which a gateway provides access protection, the content request adapted for requesting a content fragment from the server;
      receiving, at the client-side application from the gateway, a response message sent from the gateway to the client-side application responsive to the gateway determining that the requested content fragment is access-protected;
      inspecting the response message, at the client-side application, to determine whether the response message contains the requested content fragment;
      responsive to determining, at the client-side application, that the response message contains the requested content fragment, processing the requested content fragment contained in the response message; and
      responsive to determining, at the client-side application, that the response message comprises a request message containing unexpected content, the unexpected content comprising content which differs from the requested content fragment, dynamically constructing a prompt for the client-side application to respond to the request message containing the unexpected content, the client-side application lacking a pre-defined prompt for handling the unexpected content, comprising:
         creating a user input frame;
         inserting the unexpected content from the request message into the user input frame;
         displaying the user input frame;
         obtaining a user response from the displayed user input frame; and
         returning the obtained user response from the client-side application to the gateway as a response to the request message.

2. The system according to claim 1, wherein the client-side application determines that the response message comprises the request message containing the unexpected content when the response message comprises a web page document encoded in HyperText Markup Language notation.

3. The system according to claim 2, wherein the user input frame comprises an iFrame, and the unexpected content inserted into the user input frame comprises an entirety of the web page document.

4. The system according to claim 1, wherein the gateway determining that the requested content fragment is access-protected comprises the gateway determining that confirmation or additional information is required before the requested content fragment can be sent from the server to the client-side application.

5. The system according to claim 2, wherein:
   the content request sent by the client-side application is sent from script executing in the client-side application; and
   returning the obtained user response from the client-side application to the gateway further comprises dynamically modifying at least one client-side address contained in a form syntax encoded in the web page document, prior to the returning, such that the server will return the requested content fragment to a scripting language handler that is executing, in the client-side application, for sending the content request and for displaying the requested content fragment.

6. A computer program product for handling unexpected content at a client-side application, the computer program product comprising:
   a non-transitory computer readable storage medium having computer readable program code embodied therein, the computer readable program code configured for:
      sending, from a client-side application, a content request to a server for which a gateway provides access protection, the content request adapted for requesting a content fragment from the server;
      receiving, at the client-side application from the gateway, a response message sent from the gateway to the client-side application responsive to the gateway determining that the requested content fragment is access-protected;
      inspecting the response message, at the client-side application, to determine whether the response message contains the requested content fragment;
      responsive to determining, at the client-side application, that the response message contains the requested content fragment, processing the requested content fragment contained in the response message; and
      responsive to determining, at the client-side application, that the response message comprises a request message containing unexpected content, the unexpected content comprising content which differs from the requested content fragment, dynamically constructing a prompt for the client-side application to respond to the request message containing the unexpected content, the client-side application lacking a pre-defined prompt for handling the unexpected content, comprising:
         creating a user input frame;
         inserting the unexpected content from the request message into the user input frame;
         displaying the user input frame;
         obtaining a user response from the displayed user input frame; and
         returning the obtained user response from the client-side application to the gateway as a response to the request message.

7. The computer program product according to claim 6, wherein the client-side application determines that the response message comprises the request message containing the unexpected content when the request message comprises a web page document encoded in HyperText Markup Language notation.

8. The computer program product according to claim 7, wherein the user input frame comprises an iFrame, and the unexpected content inserted into the user input frame comprises an entirety of the web page document.

9. The computer program product according to claim 6, wherein the gateway determining that the requested content fragment is access-protected comprises the gateway determining that confirmation or additional information is required before the requested content fragment can be sent from the server to the client-side application.

10. The computer program product according to claim 7, wherein:
the content request sent by the client-side application is sent from script executing in the client-side application; and
returning the obtained user response from the client-side application to the gateway further comprises dynamically modifying at least one client-side address contained in an anchor syntax encoded in the web page document, prior to the returning, such that the server will return the requested content fragment to a scripting language handler that is executing, in the client-side application, for sending the content request and for displaying the requested content fragment.

11. The system according to claim 1, wherein:
the requested content fragment comprises a data string encoded in Extensible Markup Language notation; and
the unexpected content contained in the request message comprises a renderable document encoded in HyperText Markup Language notation.

12. The computer program product according to claim 6, wherein:
the requested content fragment comprises a data string encoded in Extensible Markup Language notation; and
the unexpected content contained in the request message comprises a renderable document encoded in HyperText Markup Language notation.

13. The system according to claim 5, wherein:
the script executes using Ajax technology; and
the scripting language handler is an Ajax handler.

14. The system according to claim 5, wherein the dynamically modifying at least one client-side address further comprises:
programmatically locating, in the form syntax, an <onClick> syntax element; and
programmatically modifying an address contained in the <onClick> syntax element to send the obtained user response through the scripting language handler.

15. The computer program product according to claim 10, wherein:
the script executes using Ajax technology; and
the scripting language handler is an Ajax handler.

16. The computer program product according to claim 10, wherein the dynamically modifying at least one client-side address further comprises:
programmatically locating, in the anchor syntax, an <onClick> syntax element; and
programmatically modifying an address contained in the <onClick> syntax element to send the obtained user response through the scripting language handler.

* * * * *